(12) United States Patent
Bonanno

(10) Patent No.: US 11,168,807 B2
(45) Date of Patent: Nov. 9, 2021

(54) CONCENTRICALLY ANNULAR VALVE PISTON AND SEAT

(71) Applicant: CPT GROUP GmbH, Hannover (DE)

(72) Inventor: Rosario Bonanno, Bad Soden (DE)

(73) Assignee: Vitesco Technologies GmbH, Hannover (DE)

( * ) Notice: Subject to any disclaimer, the term of this patent is extended or adjusted under 35 U.S.C. 154(b) by 5 days.

(21) Appl. No.: 16/472,027

(22) PCT Filed: Dec. 15, 2017

(86) PCT No.: PCT/EP2017/082972
§ 371 (c)(1),
(2) Date: Jun. 20, 2019

(87) PCT Pub. No.: WO2018/114644
PCT Pub. Date: Jun. 28, 2018

(65) Prior Publication Data
US 2020/0096129 A1 Mar. 26, 2020

(30) Foreign Application Priority Data
Dec. 22, 2016 (DE) .................... 10 2016 226 075.8

(51) Int. Cl.
*F16K 31/06* (2006.01)
*F16K 39/02* (2006.01)
*F16K 25/00* (2006.01)

(52) U.S. Cl.
CPC ........ *F16K 31/0655* (2013.01); *F16K 25/005* (2013.01); *F16K 31/0686* (2013.01); *F16K 39/024* (2013.01)

(58) Field of Classification Search
CPC .......... F16K 1/46; F16K 17/20; F16K 25/005; F16K 27/029; F16K 31/0655;
(Continued)

(56) References Cited

U.S. PATENT DOCUMENTS 2,735,047 A * 2/1956 Garner ................ F16K 31/0696
335/245
2,990,155 A * 6/1961 Selinder .................. F16K 47/00
251/30.03
(Continued)

FOREIGN PATENT DOCUMENTS

CN 105952931 9/2016
DE 14 56 069 10/1969
(Continued)

OTHER PUBLICATIONS

Office Action dated Jun. 23, 2020 issued in Korean Patent Application No. 10-2019-7020784.
(Continued)

*Primary Examiner* — Matthew W Jellett
(74) *Attorney, Agent, or Firm* — Cozen O'Connor

(57) ABSTRACT

A valve includes a housing, a solenoid arranged in the housing, a pin movable by the solenoid, a piston connected to the pin, and a seal. The piston is made of metal, has two regions oriented concentrically and parallel with respect to the pin axis and the seal is made of a different material than the piston. The seal is arranged in the crown region of the piston.

10 Claims, 2 Drawing Sheets

(58) Field of Classification Search
CPC .. F16K 31/0686; F16K 39/022; F16K 39/024; F02B 37/16; F02B 37/162; F02B 2039/166
See application file for complete search history.

(56) References Cited

U.S. PATENT DOCUMENTS

| | | | |
|---|---|---|---|
| 3,350,054 A | 10/1967 | Wray | |
| 4,156,439 A * | 5/1979 | Jeffries | F16K 11/0525 137/625.46 |
| 5,676,308 A | 10/1997 | Saur | |
| 5,979,778 A | 11/1999 | Saur | |
| 6,039,323 A * | 3/2000 | Mockenhaupt | F02F 7/006 277/593 |
| 6,375,157 B1 * | 4/2002 | Van de Lande | F16K 27/044 251/327 |
| 2008/0203344 A1 * | 8/2008 | Cobb | F02M 17/04 251/129.17 |
| 2013/0098340 A1 | 4/2013 | Zurke et al. | |
| 2013/0269599 A1 * | 10/2013 | Lin | C23C 16/4412 117/88 |
| 2016/0153351 A1 | 6/2016 | Turner | |
| 2016/0178082 A1 | 6/2016 | Bonanno | |
| 2017/0261113 A1 * | 9/2017 | Sato | B60T 8/363 |
| 2017/0292615 A1 | 10/2017 | Schmitz et al. | |
| 2017/0298812 A1 * | 10/2017 | Lenk | F16K 27/029 |

FOREIGN PATENT DOCUMENTS

| | | |
|---|---|---|
| DE | 295 00 897 | 5/1996 |
| DE | 19545081 | 6/1997 |
| DE | 102 48 125 | 5/2004 |
| DE | 10 2004 044 439 | 4/2006 |
| DE | 10 2014 113 540 | 2/2016 |
| DE | 10 2014 113 550 | 3/2016 |
| DE | 102014226885 | 6/2016 |
| EP | 3 067 599 | 9/2016 |
| JP | H07-189630 | 7/1995 |
| JP | 2011-117499 | 6/2011 |
| JP | 2013-530358 | 7/2013 |
| JP | 2016-530462 | 9/2016 |
| WO | WO 2006/029814 | 3/2006 |
| WO | WO 2006/124292 | 11/2006 |
| WO | WO 2012/020419 | 2/2012 |
| WO | WO 2016/041659 | 3/2016 |
| WO | WO 2016/041743 | 3/2016 |

OTHER PUBLICATIONS

International Search Report issued in corresponding PCT Appln. No. PCT/EP2017/082972.
Written Opinion issued in corresponding PCT Appln. No. PCT/EP2017/082972.
German Office Action issued in the corresponding German Application No. 10 2016 226075.8.
Office Action dated Sep. 18, 2020 issued in European Patent Application No. 17821547.1.

* cited by examiner

CONCENTRICALLY ANNULAR VALVE PISTON AND SEAT

CROSS REFERENCE TO RELATED APPLICATIONS

This is a U.S. national stage of International application No. PCT/EP2017/082972, filed on Dec. 15, 2017, which claims priority to German Application No. 10 2016 226 075.8, filed Dec. 22, 2016, the content of which are incorporated herein by reference.

BACKGROUND OF THE INVENTION

1. Field of the Invention

The invention relates to a valve having a housing, a solenoid arranged in the housing, a pin movable by the solenoid, and a piston connected to the pin, and a seal.

2. Description of the Prior Art

Such valves are used, inter alia, as a diverter valve on the turbocharger in motor vehicles to open up a bypass to the suction side in overrun operation, and are thus known. In order to prevent excessive deceleration of the turbocharger, but also to ensure a fast launch, fast opening and closing of the valve is essential. In particular during the closing process, immediate closure as a result of the abutment of the piston against a valve seat is of importance. For reasons of weight, the piston is therefore formed from plastic. The valve seat is formed by the housing of the turbocharger, on which the valve is flange-mounted. Owing to the high number of closing cycles required over the service life and the operational temperature loads, high demands are placed on the component with regard to the plastic and the design of the piston, in particular in the region of the sealing edge. The costs for such pistons correspond to this. Furthermore, in individual cases, there is a decline in the sealing action over the service life. Furthermore, owing to the pressure conditions in the lines, it is the case that, in addition to the forces in and counter to the closing direction, additional moments act on the piston and thus also on the spring, which, with respect to the spring, involves the risk of buckling.

SUMMARY OF THE INVENTION

It is therefore an object of the invention to provide a valve with reliable operating characteristics over the service life. Here, the valve should be inexpensive.

This object may be achieved, according to one aspect of the invention, if the piston is made of metal, has two regions oriented concentrically and parallel with respect to the pin axis and has a seal composed of a different material than that of the piston, and wherein the seal is arranged in the crown region of the piston.

The formation of the piston from metal with the seal arranged in the crown region permits the separation of the function of sealing from the piston itself. This allows the seal to be configured in a manner directed exclusively to the sealing function, such that the sealing function is improved. At the same time, in this way, the piston can be of simpler design, whereby its production is inexpensive. The provision of two regions arranged concentrically and parallel with respect to the pin axis has the advantage that the outer area, as before, forms the outer lateral surface of the piston, and the inner concentric region is used for supporting the spring. The considerably reduced complexity of the piston, in particular in the base region, permits the production of the piston by deep drawing. A metal piston also has the advantage of higher temperature resistance, such that the valve according to the invention can cover a wider field of application, in particular at relatively high temperatures.

Greater resistance to aggressive media and thus a longer service life are realized if the piston is composed of high-grade steel, preferably a chromium-nickel steel.

Good media resistance is achieved in the case of the seal in that a rubber, preferably ethylene propylene diene monomer (EPDM), or a plastic, preferably polyphthalamide (PPA), is used as the sealing material. Both rubber and plastic are well suited for sealing against metallic valve seats. Furthermore, they can compensate for positional inaccuracies owing to tolerances or over the service life.

According to one advantageous refinement, the connection of the seal to the piston is particularly simple if the seal is of annular form and has a slot in which an edge, averted from the housing, of the piston is arranged. In this refinement, the seal can in the simplest case, and thus particularly inexpensively, be pressed onto the edge. In another advantageous refinement, the seal is vulcanized onto the edge. In this way, a particularly intimate bond of piston and seal is achieved. If the seal is made of plastic, it is also possible for the edge to be overmolded with the seal.

Depending on the sealing requirements and the installation location, the seal can be adapted in a targeted manner. This can be realized in a simple manner by the thickness of the seal body, wherein the seal body is to be understood as being that part of the seal arranged outside the piston. It has been found here that a thickness of 0.3 mm to 5 mm, preferably of 0.5 mm to 3 mm, is advantageous.

The two regions arranged concentrically and parallel with respect to the pin axis can be generated particularly easily by virtue of the fact that the outer region is the lateral surface of a pot-shaped piston and the inner region, situated between pin and lateral surface of the piston, is a cylinder connected to the piston, preferably by welding. However, the piston can be manufactured as a deep-drawn part and thus in only one working step and particularly inexpensively if, according to a further advantageous refinement, the two regions oriented concentrically and parallel with respect to the pin axis are integrally connected to one another. The radially outer region likewise forms the lateral surface of the piston, whereas the radially inner region protects the spring against buckling. No additional component is required.

Buckling of the spring is reliably prevented if the radially inner region has at least 30%, preferably 50% and in particular 80% of the piston height.

The connection of the piston to the pin may be realized either by welding or riveting. Both types of connection have the advantage that the piston can be connected directly and thus without an additional component to the pin, which is likewise composed of metal. In the case of a plastics piston, an additional connecting part is required for the connection thereof to the pin.

The connection to the pin is simplified if the radially inner region for the support of the spring transitions into a planar region which forms the crown of the piston.

Owing to the greater stability of metal in relation to plastic, the wall thickness of the piston can be made significantly smaller. Depending on the field of use, it has proven to be advantageous if the metal of the piston has a thickness of 0.3 mm to 0.8 mm, preferably of 0.4 mm to 0.6 mm and in particular of 0.5 mm. Here, the smaller wall thickness of a metal piston in relation to a piston composed of plastic compensates for the higher density of metal in relation to plastic, such that the weight of the valve is not significantly affected.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
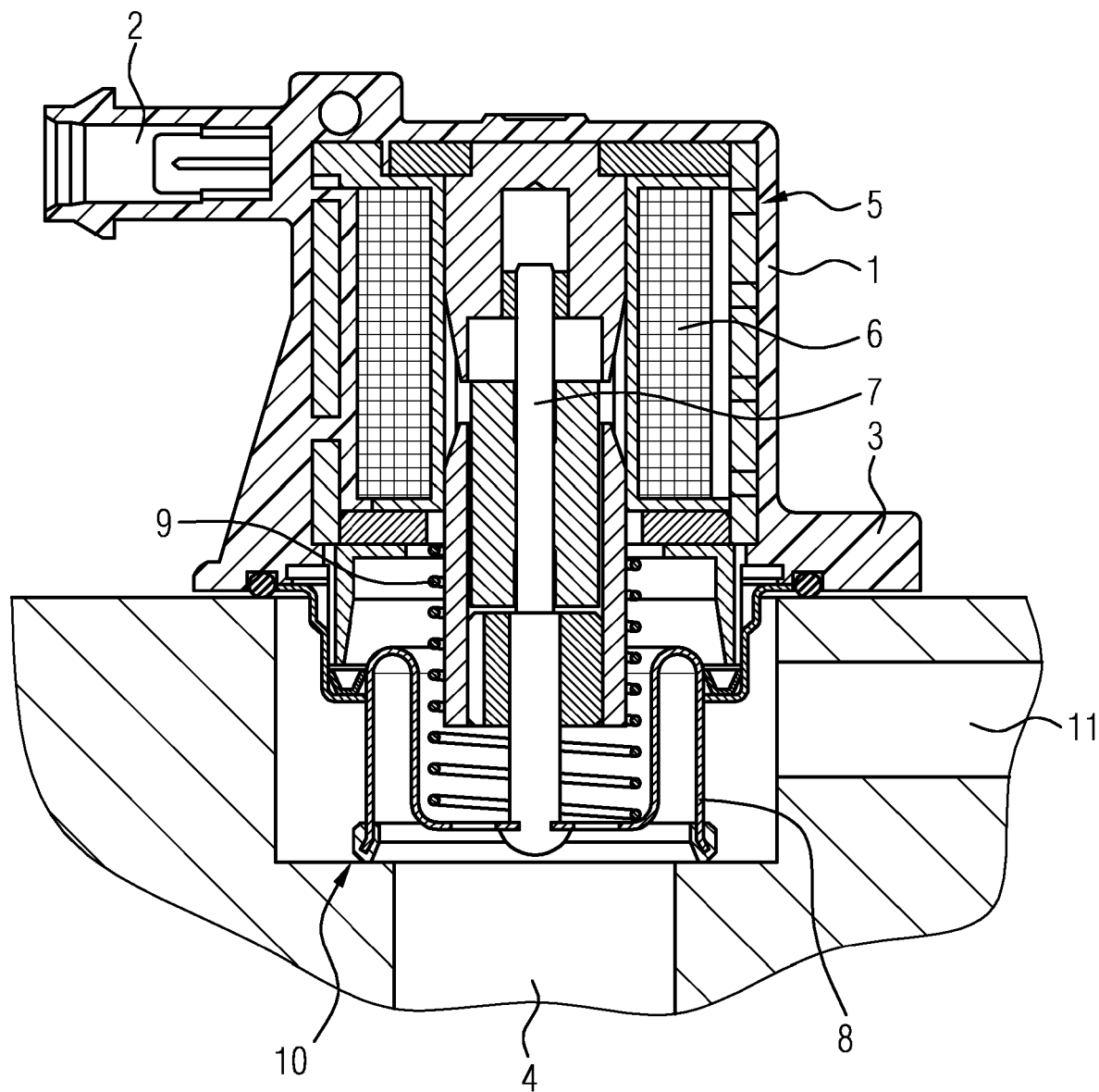
FIG. 1 is a sectional illustration of the valve according to the invention.

FIG. 1 shows the valve comprising a housing 1 with integrally molded socket 2 for the electrical connection of the valve. The housing 1 furthermore has an integrally formed flange 3 and three bores (not illustrated), by which the housing 1 is flange-mounted on a turbocharger (not illustrated) in the region of the bypass line 4. In the housing 1, there is arranged a solenoid 5 with a coil 6 and a metal pin 7. The metal pin 7 is connected to a pot-shaped piston 8 composed of a chromium-nickel steel by a rivet connection. A spring 9 preloads the piston 8, in the non-actuated state of the solenoid 5, against a valve seat 10 in order to close off the bypass line 4, such that no medium can flow from the bypass line 4 into the line 11. Here, the spring 9 is supported on the solenoid 5 and on the piston 8. The piston 8 has a wall thickness of 0.5 mm.

Figure 2:
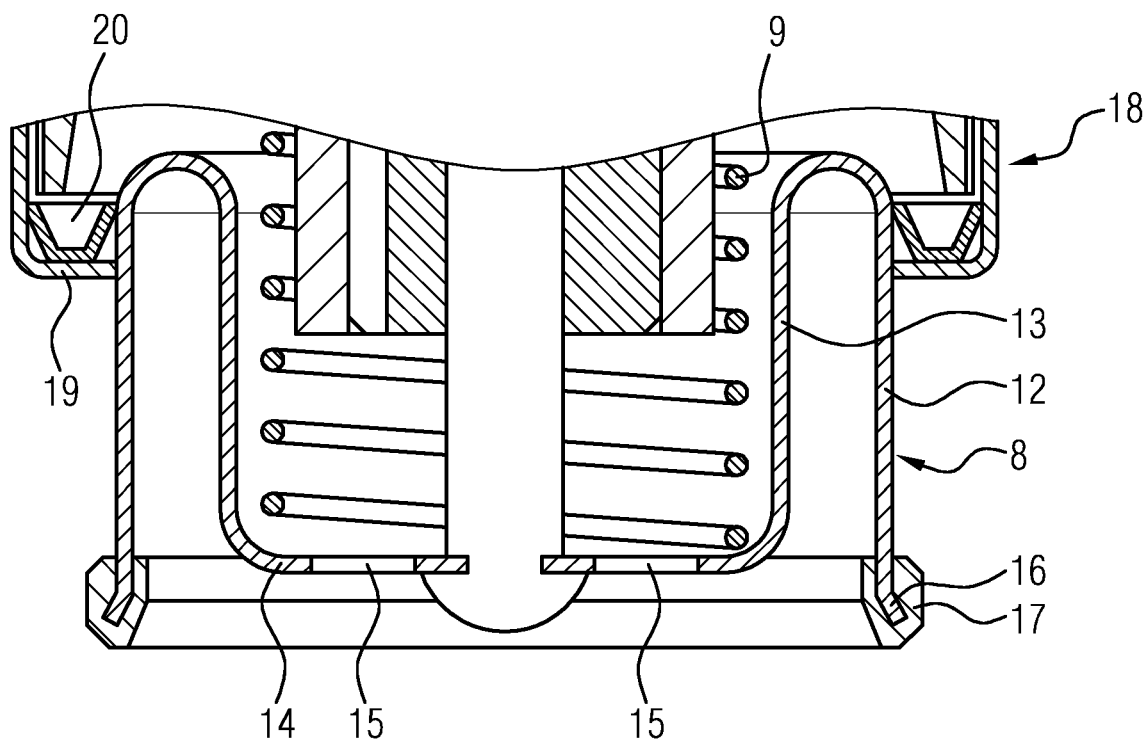
FIG. 2 is an enlarged sectional illustration of the piston.

FIG. 2 illustrates two concentric regions 12, 13 of the piston 8 which are oriented parallel with respect to the pin axis and which are integrally connected to one another by virtue of one region 12 transitioning through a 180° diversion into the other region 13. The radially outer region 12 forms the lateral surface of a pot-shaped piston 8. The radially inner region 13 prevents buckling of the spring 9. In the radially inward direction, the region 13 transitions into a planar region 14 which forms the crown of the piston 8. The region 14 has a bore through which the metal pin 7 is guided and riveted to the crown. Additional openings 15 provided in the planar region 14 allow pressure equalization with the interior of the valve. The radially outer region 12 has, on its side averted from the housing 1, an encircling edge 16. A seal 17 made of PPA is molded onto the edge. In order to additionally prevent a detachment of the seal 17 from the edge, the edge 16 is angled radially outward at an angle of less than 45°. It is also conceivable to increase the bond of seal 17 and edge 16 by virtue of the edge 16 having openings which are filled by the plastics material during the overmolding of the edge 16 with the seal 17. During the opening and closing of the valve, the piston 8 moves relative to a housing part 18 belonging to the housing 1. The housing part 18 has a radially inwardly directed collar 19, on which a V-shaped seal 20 lies. The seal 20 is held on the opposite side by a part of the housing 1. The radially inner sealing lip of the seal 20 bears against the region 12, which forms the lateral surface of the piston 8.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing (1);
a solenoid (5) arranged in the housing (1);
a pin (7) movable by the solenoid (5) and having a pin axis;
a piston (8) connected to the pin (7), the piston (8) having a crown region;
a spring (9) configured to preload the piston (8); and
a seal (17) arranged in the crown region of the piston (8),
wherein the piston (8) is made of metal, has a first, radially outer region (12) and a second, radially inner region (13), the first and second regions being oriented concentrically and parallel to one another and with respect to the pin axis, such that the spring (9) is arranged radially inside of both the radially outer region (12) and the radially inner region (13) of the piston (8), and the seal (17) is made of a different material than the piston, and
wherein the first and second regions of the piston (8) are integrally connected to one another by the first region (12) transitioning through a 180 degree diversion into the second region (13).

2. The valve as claimed in claim 1, wherein the piston is made of high-grade steel.

3. The valve as claimed in claim 2, wherein the seal (17) comprises an Ethylene Propylene Diene Monomer (EPDM) rubber, or a Polyphthalamide (PPA) plastic.

4. The valve as claimed in claim 3, wherein the seal (17) is annular and has a slot in which is arranged an edge of the piston that is averted from the housing.

5. The valve as claimed in claim 4, wherein the seal has a thickness of at least one selected from the group of: 0.3 mm to 5 mm and 0.5 mm to 3 mm.

6. The valve as claimed in claim 3, wherein the first and second concentric regions oriented parallel to the pin axis are integrally connected to one another.

7. The valve as claimed in claim 1, wherein the radially inner region (13) has at least 30% of the piston height.

8. The valve as claimed in claim 1, wherein the piston is directly connected to the pin by one selected from the group of: welding and riveting.

9. The valve as claimed in claim 1, wherein the metal of the piston (8) has a thickness of at least one selected from the group of: 0.3 mm to 0.8 mm, 0.4 mm to 0.6 mm and 0.5 mm.

10. The valve as claimed in claim 2, wherein the high-grade steel is a chromium-nickel steel.

* * * * *